(12) United States Patent
Koh

(10) Patent No.: US 11,820,317 B1
(45) Date of Patent: Nov. 21, 2023

(54) AIRBAG CUSHION

(71) Applicant: HYUNDAI MOBIS CO., LTD., Seoul (KR)

(72) Inventor: Min Seok Koh, Yongin-si (KR)

(73) Assignee: HYUNDAI MOBIS CO., LTD., Seoul (KR)

( * ) Notice: Subject to any disclaimer, the term of this patent is extended or adjusted under 35 U.S.C. 154(b) by 0 days.

(21) Appl. No.: 17/934,907

(22) Filed: Sep. 23, 2022

(30) Foreign Application Priority Data

Jun. 22, 2022 (KR) .................. 10-2022-0076082

(51) Int. Cl.
| | |
|---|---|
| *B60R 21/2338* | (2011.01) |
| *B60R 21/237* | (2006.01) |
| *B60R 21/205* | (2011.01) |
| *B60R 21/233* | (2006.01) |
| *B60R 21/235* | (2006.01) |

(52) U.S. Cl.
CPC .......... *B60R 21/233* (2013.01); *B60R 21/205* (2013.01); *B60R 21/237* (2013.01); *B60R 2021/23308* (2013.01); *B60R 2021/23382* (2013.01); *B60R 2021/23538* (2013.01)

(58) Field of Classification Search
CPC . B60R 21/233; B60R 21/231; B60R 21/2338; B60R 21/237; B60R 21/205; B60R 2021/23308; B60R 2021/23538; B60R 2021/23382; B60R 2021/0048; B60R 2021/0009; B60R 2021/0023; B60R 2021/0004
USPC .......................... 280/729, 730.1, 732, 743.1
See application file for complete search history.

(56) References Cited

U.S. PATENT DOCUMENTS

| | | | | |
|---|---|---|---|---|
| 7,681,917 | B2* | 3/2010 | Guillo | B32B 5/02 |
| | | | | 280/743.2 |
| 10,328,884 | B2* | 6/2019 | Kobayashi | B60R 21/231 |
| 11,155,232 | B2 | 10/2021 | Moon | |
| 2013/0113190 | A1* | 5/2013 | Schneider | B60R 21/206 |
| | | | | 280/743.1 |

(Continued)

FOREIGN PATENT DOCUMENTS

| | | |
|---|---|---|
| DE | 10-2020-134796 | 6/2022 |
| JP | 2001138848 A * | 5/2001 |

(Continued)

OTHER PUBLICATIONS

English Language Abstract of KR 10-1209927 published Dec. 10, 2012.

(Continued)

*Primary Examiner* — Keith J Frisby
(74) *Attorney, Agent, or Firm* — DLA PIPER LLP (US)

(57) ABSTRACT

An airbag cushion according to an embodiment may include a main body including a rear panel having a rear bonding line and a front panel having a front bonding line bonded to the rear bonding line and disposed to face a passenger when inflated by a gas introduced into an inner space formed between the front panel and the rear panel and a protruding chamber which is inflated and protrudes toward the passenger from the front panel, wherein the protruding chamber is provided with a folding structure in a state in which a part of the front panel is folded, and the folding structure is unfolded and inflated as the main body is inflated by the gas introduced into the inner space.

12 Claims, 11 Drawing Sheets

(56) References Cited

U.S. PATENT DOCUMENTS

| | | | |
|---|---|---|---|
| 2017/0166159 A1* | 6/2017 | Shin | B60R 21/231 |
| 2019/0001916 A1 | 1/2019 | Jo | |
| 2019/0308580 A1* | 10/2019 | Choi | B60R 21/2338 |
| 2020/0223390 A1* | 7/2020 | Munoz Melgar | B60R 21/231 |
| 2021/0122322 A1* | 4/2021 | Koh | B60R 21/233 |
| 2023/0075554 A1* | 3/2023 | Choi | B60R 21/237 |

FOREIGN PATENT DOCUMENTS

| | | |
|---|---|---|
| KR | 10-1209927 | 12/2012 |
| KR | 20150051758 A * | 5/2015 |
| KR | 20170100123 A * | 9/2017 |

OTHER PUBLICATIONS

English Language Abstract of DE 10-2020-134796 dated Jun. 2, 2022.

German Office Action dated Jul. 19, 2023 issued in DE Application No. 10 2022 127 891.3.

* cited by examiner

E-E

//AIRBAG CUSHION

CROSS-REFERENCE TO RELATED APPLICATION

This application claims priority to and the benefit of Korean Patent Application No. 10-2022-0076082, filed on Jun. 22, 2022, the disclosure of which is incorporated herein by reference in its entirety.

BACKGROUND

Field of the Invention

The present invention relates to an airbag cushion, and more specifically, to an airbag cushion capable of increasing a restraint force for a passenger.

Discussion of Related Art

Generally, an airbag device is a device configured to be inflated by a pressure of gas introduced into an airbag cushion so as to protect a passenger through a cushion force when a vehicle accident occurs.

To secure overseas sales networks, automakers are developing and selling vehicles which meet a small overlap crash test hosted by the American Insurance Institute for Highway Safety (IIHS).

The small overlap crash test has been performed under conditions of a vehicle speed of 64 km/h, an angle of zero degrees in a forward direction, an offset amount of 25%, and with a barrier of a rigid column. However, in the future, a task of passing a new frontal research moving deformable barrier test more in consideration of the safety of passengers should be achieved.

Conditions of the new frontal research moving deformable barrier test are a vehicle speed of 90.1 km/h, an angle of 15 degrees in a diagonal direction, an offset amount of 35%, and with a barrier of a research moving deformable barrier (RMDB). When the crash occurs, a dummy excessively moves in a lateral direction, and when the face comes into contact with an airbag cushion, the head is excessively rotated, and thus there is a problem of causing a serious brain injury.

RELATED ART

Patent Document

Korean Registered Patent No. 10-1209927

SUMMARY OF THE INVENTION

The present invention is directed to providing an airbag cushion capable of protecting a passenger by effectively restraining rotational movement of a head of the passenger when a vehicle crashes.

Objectives of the present invention are not limited to the above-described objectives, and other objectives which are not described above may be clearly understood by those skilled in the art through the description below.

According to an aspect of the present invention, there is provided an airbag cushion including a main body including a rear panel having a rear bonding line and a front panel having a front bonding line bonded to the rear bonding line and disposed to face a passenger when inflated by a gas introduced into an inner space formed between the front panel and the rear panel and a protruding chamber which is inflated and protrudes toward the passenger from the front panel, wherein the protruding chamber is provided with a folding structure in a state in which a part of the front panel is folded, and the folding structure is unfolded and inflated as the main body is inflated by the gas introduced into the inner space.

The front panel may include a protruding part partially protruding from at least one side surface of left and right surfaces based on a center line in a longitudinal direction, the protruding part may include an upper end surface, a lower end surface, and an outer side surface connecting an end of the upper end surface and an end of the lower end surface, a cut line cut inward toward the center line may be formed at a portion at which the lower end surface protrudes outward from the one side surface, and the folding structure, which is folded to be parallel to the center line so as to form the protruding chamber, may be formed on the cut line in a state in which the outer side surface is disposed to match the one side surface so that the front bonding line is continuously connected to and extends along the one side surface.

A chamber strap, which supports an opening facing the inner space to maintain a shape of the opening in a state in which the protruding chamber is inflated, may be attached to a surface facing the inner space of the front panel, and one end portion of the chamber strap may be sewed onto an edge of the outer side surface of the protruding part, and the other end portion is sewed onto a central portion of the front panel so that the chamber strap is disposed to cross the folding structure.

The airbag device may further include a front tether of which one end portion is connected to the central portion of the front panel and the other end portion is connected to the rear panel.

Chamber reinforcement patches, which seal the cut line in a state in which the folding structure is formed, may be attached to a surface facing the inner space of the front panel and an opposite surface, each of the chamber reinforcement patches may be disposed to cover the cut line, one end portion of the chamber reinforcement patch may be sewed onto an edge of the outer side surface of the protruding part and an edge of the one side surface, the other end portion of the chamber reinforcement patch may be sewed onto the front panel at an inner end of the cut line, and an upper end portion and a lower end portion of the chamber reinforcement patch may be sewed onto the front panel along the cut line interposed between the upper end portion and the lower end portion.

The airbag device may include a seam saver interposed between the rear panel and an edge of the front panel and integrally sewed onto the rear panel and the front panel, wherein the seam saver may reinforce a strength of a portion in which the rear panel and the front panel are sewed onto each other.

The upper end surface of the protruding part may be positioned at the same level as an upper surface of the front panel so as to be consecutively connected to the upper surface.

The upper end surface of the protruding part may be positioned at a different level from an upper surface of the front panel so as to be stepped with respect to the upper surface.

The cut line cut inward toward the center line may be formed in the front panel at the portion at which the upper end surface protrudes outward from the one side surface, and the upper end surface may be continuously connected to the cut line.

The front bonding line may include a first front bonding line disposed in an upper portion of the front panel and a second front bonding line disposed in a lower portion of the front panel, and the rear bonding line may include a first rear bonding line bonded to the first front bonding line, a second rear bonding line bonded to the second front bonding line, and a third rear bonding line disposed between the first rear bonding line and the second rear bonding line and including first bonding portions and second bonding portions which are provided to be bonded to each other.

The first front bonding line may include a first front center portion forming an upper surface of the front panel and first front side portions extending downward from two ends of the first front center portion and forming the side surface of the front panel, and the second front bonding line may include second front side portions having a width smaller than a width of the first front side portions and extending downward from the first front side portions to form the side surface of the front panel and a second front center portion connecting lower ends of the second front side portions to form a lower surface of the front panel.

The first rear bonding line may include a first rear center portion bonded to the first front center portion and first rear side portions of which one ends are connected to the first rear center portion and the other ends are connected to the first bonding portions and which are bonded to the first front side portions, and the second rear bonding line may include a second rear center portion bonded to the second front center portion and second rear side portions of which one ends are connected to the second rear center portion and the other ends are connected to the second bonding portions and which are bonded to the second front side portions.

The rear panel may include a first panel having the first rear bonding line, the first bonding portions, and a first bonding region disposed under the first bonding portions and a second panel having the second rear bonding line, the second bonding portions, and a second bonding region disposed under the second bonding portions, a first inlet may be formed between the first bonding portions and the first bonding region in the first panel, a second inlet may be formed between the second bonding portions and the second bonding region in the second panel, the first panel and the second panel may be disposed to overlap so as to connect the first inlet and the second inlet in a state in which the second panel is reversed so that the second bonding region faces upward, and the first panel and the second panel may be sewed onto and connected to each other in the first bonding region and the second bonding region.

BRIEF DESCRIPTION OF THE DRAWINGS

The above and other objects, features and advantages of the present invention will become more apparent to those of ordinary skill in the art by describing exemplary embodiments thereof in detail with reference to the accompanying drawings, in which.

DETAILED DESCRIPTION OF EXEMPLARY EMBODIMENTS

Figure 1:
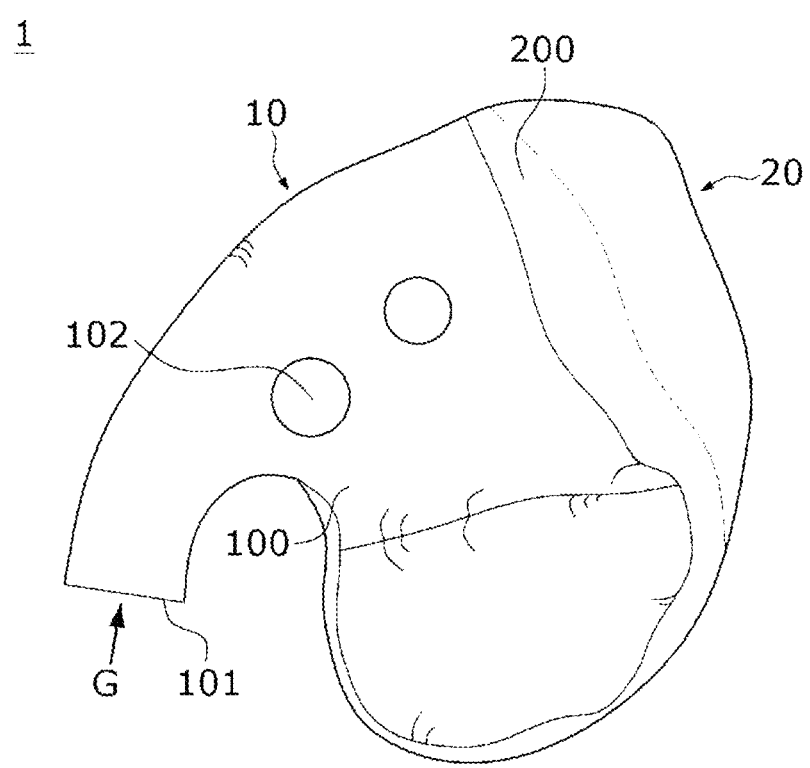
FIG. 1 is a schematic perspective view illustrating an airbag cushion according to an embodiment of the present invention.

Since the present invention allows various changes and has many embodiments, specific embodiments will be illustrated in the accompanying drawings and described. However, this is not intended to limit the present invention to the specific embodiments, and it is to be appreciated that all changes, equivalents, and substitutes that fall within the spirit and technical scope of the present invention are encompassed in the present invention. Although the terms "first," "second," and the like may be used herein to describe various elements, these elements should not be limited by these terms. These terms are only used to distinguish one element from another element. For example, a second element could be termed a first element, and a first element could similarly be termed a second element without departing from the scope of the present invention. The term "and/or" includes any one or any combination among a plurality of associated listed items.

When an element is referred to as being "connected" or "coupled" to another element, it will be understood that the element can be directly connected or coupled to another element, or other elements may be present therebetween. In contrast, when an element is referred to as being "directly connected" or "directly coupled" to another element, it will be understood that there are no intervening elements.

In a description of the embodiment, in a case in which any one element is described as being formed on or under another element, such a description includes both a case in which the two elements are formed in direct contact with each other and a case in which the two elements are in indirect contact with each other with one or more other elements interposed between the two elements. In addition, when one element is described as being formed on or under another element, such a description may include a case in which the one element is formed at an upper side or a lower side with respect to another element.

The terminology used herein is for the purpose of describing particular embodiments only and is not intended to limit the present invention. The singular forms are intended to include the plural forms, unless the context clearly indicates otherwise. In the present specification, it should be further understood that the terms "comprise," "comprising," "include," and/or "including," when used herein, specify the presence of stated features, numbers, steps, operations, elements, and/or components but do not preclude the presence or addition of one or more other features, numbers, steps, operations, elements, components, and/or groups thereof.

Unless otherwise defined, all terms including technical and scientific terms used herein have meanings which are the same as meanings generally understood by those skilled in the art. Terms, such as those defined in commonly used dictionaries, should be interpreted as having meanings that are consistent with their meanings in the context of the relevant art and will not be interpreted in an idealized or overly formal sense unless expressly so defined here.

Hereinafter, when embodiments are described in detail with reference to the accompanying drawings, components that are the same or correspond to each other will be denoted by the same or corresponding reference numerals in all drawings, and redundant descriptions will be omitted.

Figure 2:
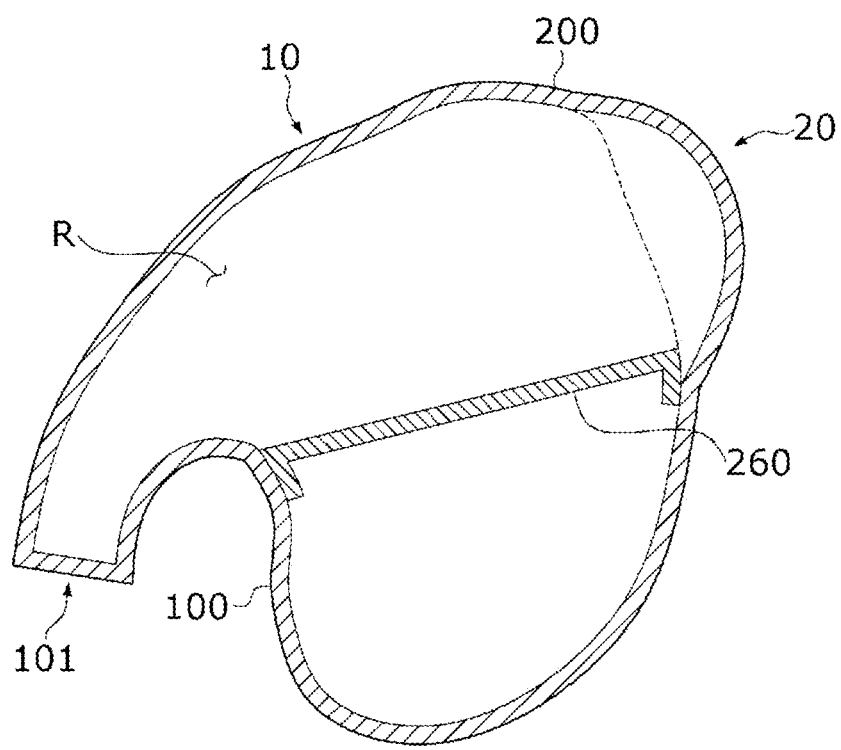
FIG. 2 is a schematic cross-sectional view illustrating the airbag cushion of FIG. 1.
Figure 3:
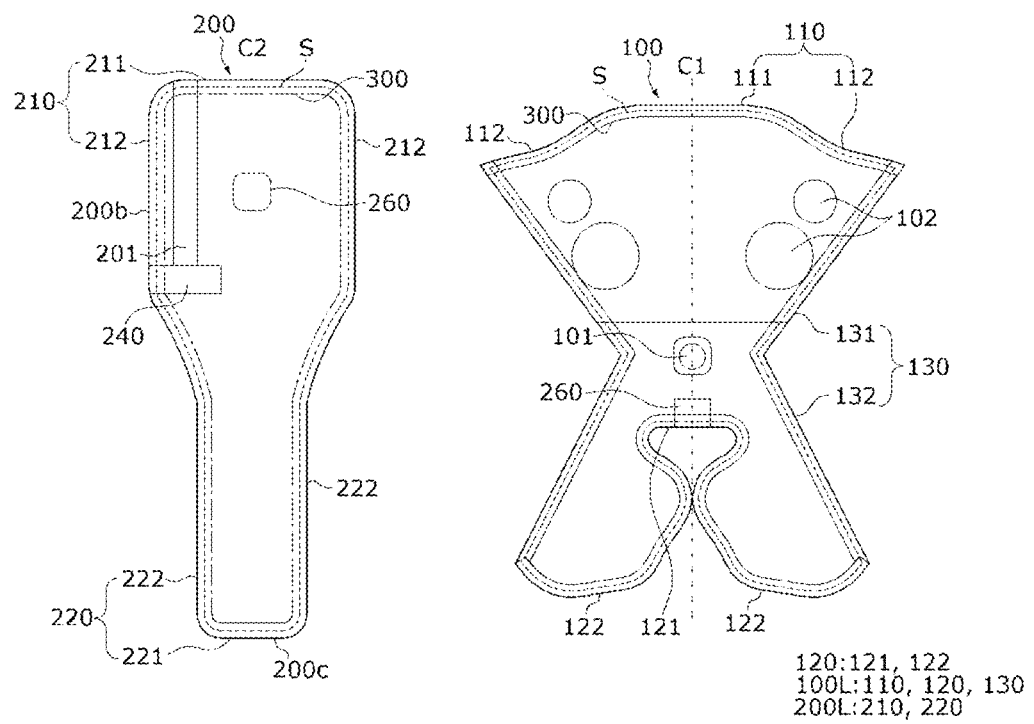
FIG. 3 is a schematic view illustrating a front panel and a rear panel constituting a main body in the airbag cushion.

FIG. 1 is a schematic perspective view illustrating an airbag cushion according to an embodiment of the present invention, FIG. 2 is a schematic cross-sectional view illustrating the airbag cushion of FIG. 1, and FIG. 3 is a schematic view illustrating a front panel and a rear panel constituting a main body in the airbag cushion.

Referring to the drawings, an airbag cushion 1 according to the embodiment of the present invention may include a main body 10 and a protruding chamber 20.

The main body 10 may be connected to an inflater (not shown), which generates gas G, and formed to be inflated by the gas G generated by the inflater.

The main body 10 may include a rear panel 100 including a rear bonding line 100L and a front panel 200 including a front bonding line 200L bonded to the rear bonding line 100L. In the embodiment, each of the rear panel 100 and the front panel 200 may be formed of a fabric cut in a predetermined shape.

A gas inlet 101 connected to the inflater may be formed in the rear panel 100. In addition, vent holes 102 through which gas is discharged may be formed in the rear panel 100.

The front panel 200 may be mutually bonded to the rear panel 100 to form an inner space R and disposed to face a passenger when the gas G is introduced into the inner space R through the gas inlet 101 to inflate the inner space R.

The protruding chamber 20 may be provided on the front panel 200, inflated along with the main body 10, and formed to protrude from the front panel 200 toward the passenger.

Specifically, the protruding chamber 20 may be provided with a folding structure 201 in a state in which a part of the front panel 200 is folded. In addition, the folding structure 201 may be formed to be unfolded and inflated as the main body 10 is inflated by the gas G introduced into the inner space R.

That is, the protruding chamber 20 is formed as a part of the front panel 200 forming the main body 10 instead of being manufactured separately from and bonded to the main body 10. Accordingly, the protruding chamber 20 is integrally formed with the front panel 200, and since a separate additional process and components for forming the protruding chamber 20 may be omitted, there are effects of reducing overall manufacturing processes and costs.

Hereinafter, structures of the front panel 200 and the rear panel 100 will be more specifically described.

Referring to the drawings, the front bonding line 200L is formed along an edge of the front panel 200, and the front bonding line 200L may include a first front bonding line 210 disposed on an upper portion of the front panel 200 and a second front bonding line 220 disposed on a lower portion of the front panel 200.

In the embodiment, the first front bonding line 210 may include a first front center portion 211 forming an upper surface 200a of the front panel 200 and first front side portions 212 extending downward from two ends of the first front center portion 211 and forming a side surface 200b of the front panel 200.

In addition, the second front bonding line 220 may include second front side portions 222 each having a width smaller than a width of each of the first front side portions 212, extending downward from the first front side portions 212, and forming the side surface 200b of the front panel 200, and a second front center portion 221 which connects lower ends of the second front side portions 222 to form a lower surface 200c of the front panel 200.

Referring to the drawings, the rear bonding line 100L is formed on the rear panel 100, and the rear bonding line 100L may include a first rear bonding line 110 bonded to the first front bonding line 210 and a second rear bonding line 120 disposed under the first rear bonding line 110 and bonded to the second front bonding line 220. In addition, the rear bonding line 100L may include a third rear bonding line 130 disposed between the first rear bonding line 110 and the second rear bonding line 120 and including first bonding portions 131 and second bonding portions 132 which are provided to be coupled to each other.

In the embodiment, the first rear bonding line 110 may include a first rear center portion 111 bonded to the first front center portion 211 and first rear side portions 112 of which one ends are connected to the first rear center portion 111 and the other ends are connected to the first bonding portions 131 and which are bonded to the first front side portions 212.

The first rear center portion 111 may have a length corresponding to the first front center portion 211, and the first rear side portions 112 may be provided at two sides of the first rear center portion 111, have a smooth curved shape, and extend downward. Each of the first rear side portions 112 may have a length corresponding to each of the first front side portions 212.

The second rear bonding line 120 may include a second rear center portion 121 bonded to the second front center portion 221 and second rear side portions 122 of which one ends are connected to the second rear center portion 121 and the other ends are connected to the second bonding portions 132 and which are bonded to the second front side portions 222.

The second rear center portion 121 may have a length corresponding to the second front center portion 221, and the second rear side portions 122 may be provided at two sides of the second rear center portion 121, protrude toward each other, have a convexly curved shape, and extend downward. Each of the second rear side portions 122 may have a length corresponding to each of the second front side portions 222.

In the rear bonding line 100L, the third rear bonding line 130 is a portion which is not bonded to the front panel 200. The first bonding portions 131 may be provided as a pair of the first bonding portions 131 and extend from two ends of the first rear side portions 112 toward the second rear bonding line 120. The second bonding portions 132 may also be provided as a pair of the second bonding portions 132 and extend from two ends of the second rear side portions 122 toward the first rear bonding line 110.

Each of the first bonding portions 131 and each of the second bonding portions 132 may have the same length.

The first bonding portions 131 and the second bonding portions 132 may be connected to each other at left and right sides based on the gas inlet 101 positioned at a center of the rear panel 100. That is, one end of the first bonding portion 131 may be connected to the first rear side portion 112, and the other end may be connected to the second bonding portion 132. One end of the second bonding portion 132 may be connected to the second rear side portion 122, and the other end may be connected to the first bonding portion 131.

A left-right width between the first bonding portions 131 and a left-right width between the second bonding portions 132 based on a center line C1 in a longitudinal direction of the rear panel 100 may gradually increase, and the first bonding portions 131 and the second bonding portions 132 may extend from a central portion of the rear panel 100 in opposite directions. Accordingly, the rear panel 100 may have substantially a hourglass shape having a slender central portion.

Figure 4:
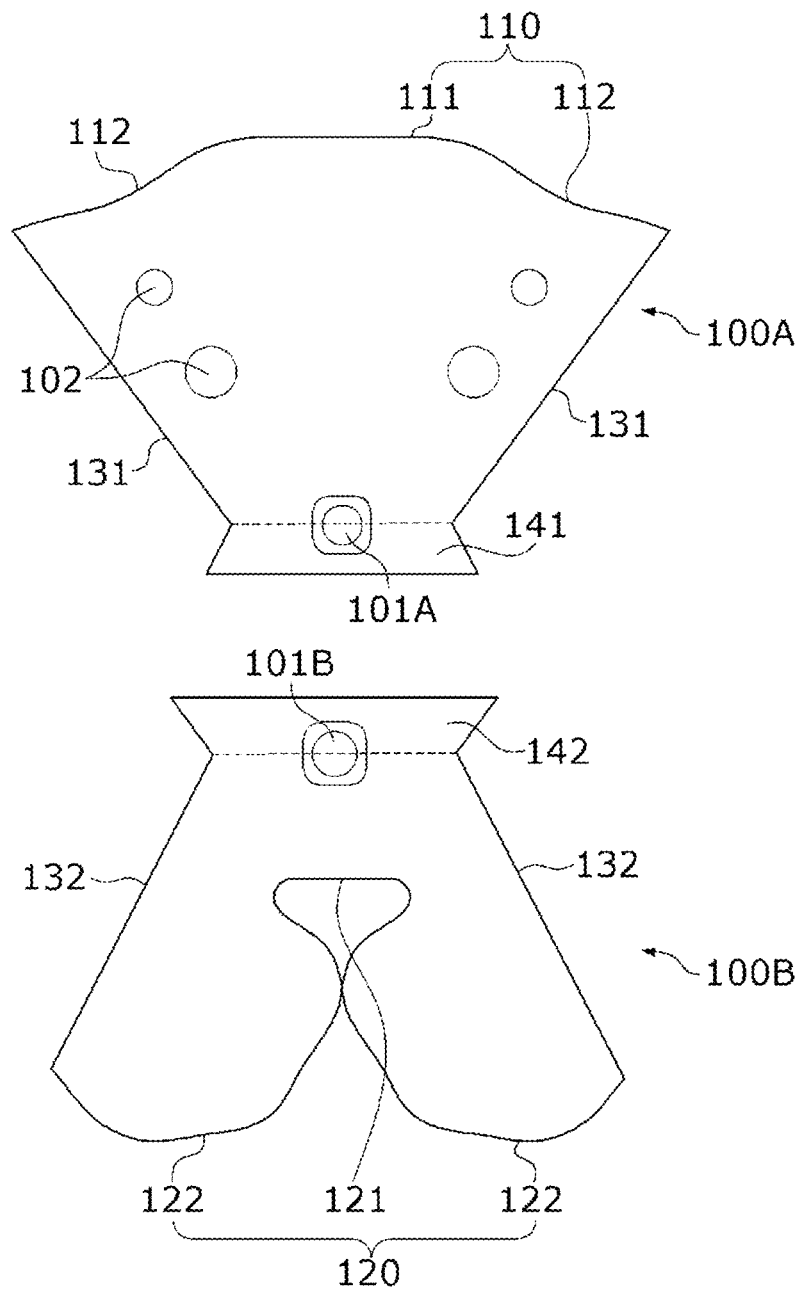
FIG. 4 is a schematic view illustrating a first panel and a second panel constituting the rear panel of FIG. 3.

FIG. 4 is a schematic view illustrating a first panel 100A and a second panel 100B constituting the rear panel 100. In the embodiment, as in FIG. 4, the rear panel 100 may include the first panel 100A and the second panel 100B.

The first panel 100A may include the first rear bonding line 110, the first bonding portions 131, and a first bonding region 141 disposed under the first bonding portions 131. In addition, the vent holes 102 may be included in the first panel 100A. The second panel 100B may include the second rear bonding line 120, the second bonding portions 132, and a second bonding region 142 disposed under the second bonding portions 132.

In addition, a first inlet 101A may be formed between the first bonding portions 131 and the first bonding region 141 in the first panel 100A, and a second inlet 101B may be formed between the second bonding portions 132 and the second bonding region 142 in the second panel 100B. The first inlet 101A and the second inlet 101B may form the gas inlet 101 in a state in which the first inlet 101A and the second inlet 101B overlap and are connected to each other.

The rear panel 100 including the first panel 100A and the second panel 100B may be formed so that the first panel 100A and the second panel 100B are disposed to overlap to connect the first inlet 101A to the second inlet 101B, and the first panel 100A and the second panel 100B are sewed and connected in the first bonding region 141 and the second bonding region 142 in a state in which the second panel 100B is reversed so that the second bonding region 142 faces upward.

Meanwhile, in a state in which the rear panel 100 is folded in half along the gas inlet 101 in the central portion, the first bonding portions 131 may be bonded to the second bonding portions 132. Accordingly, the end of the first rear side portion 112 connected to the first bonding portion 131 may be consecutively connected to the end of the second rear side portion 122 connected to the second bonding portion 132.

In a state in which the first rear side portion 112 and the second rear side portion 122 are consecutively connected to each other, the first front side portion 212 of the front panel 200 is bonded to the first rear side portion 112, and subsequently, the second front side portion 222 may be bonded to the second rear side portion 122. In addition, the first front center portion 211 of the front panel 200 may be bonded to the first rear center portion 111 of the rear panel 100, and the second rear center portion 121 may be bonded to the second front center portion 221.

As described above, the main body 10 of the airbag cushion 1 may be completely formed by bonding the rear panel 100 and the front panel 200 along the rear bonding line 100L and the front bonding line 200L.

In the embodiment, a seam saver 300 may be provided between the rear panel 100 and the front panel 200.

The seam saver 300 may be interposed between the rear panel 100 and the front panel 200 to serve as an edge reinforcement member for reinforcing a strength of a sewing portion S between the rear panel 100 and the front panel 200, extend along an edge, and be integrally sewed with the rear panel 100 and the front panel 200.

The seam saver 300 may be formed of the same material, for example, the fabric, as the rear panel 100 and the front panel 200 but is not limited thereto.

Meanwhile, the airbag cushion 1 according to the embodiment of the present invention may include the protruding chamber 20 connected to and inflated with the main body 10, and the protruding chamber 20 may be integrally provided with the front panel 200.

Specifically, the protruding chamber 20 may be provided with the folding structure 201 in a state in which a part of the front panel 200 is folded. Hereinafter, a structure of the front panel 200 will be more specifically described.

Figure 5:
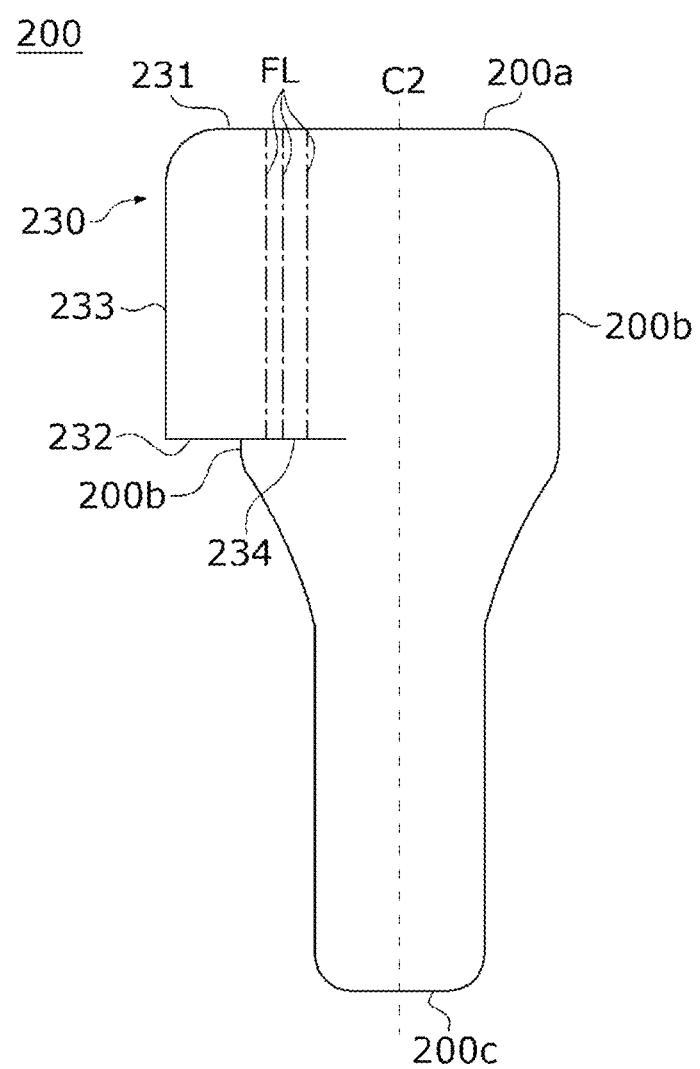
FIG. 5 is a schematic view illustrating the front panel provided with a protruding part.
Figure 6:
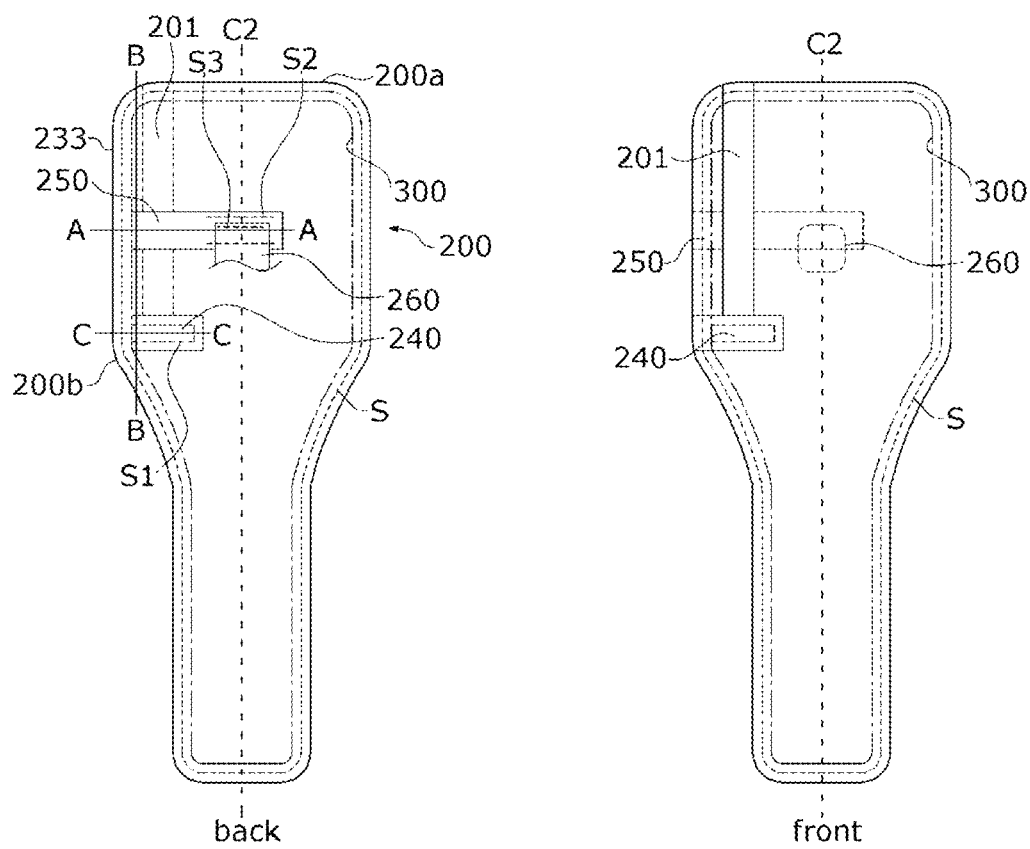
FIG. 6 is a schematic view illustrating the front panel in which a folding structure is formed.

FIG. 5 is a schematic view illustrating the front panel 200 provided with a protruding part 230. In addition, FIG. 6 is a schematic view illustrating the front panel 200 in which the folding structure 201 is formed.

Referring to the drawings, the front panel 200 may include the protruding part 230 partially protruding outward from at least one side surface 200b of left and right surfaces based on the center line C2 in the longitudinal direction.

The protruding part 230 may include an upper end surface 231, a lower end surface 232, and an outer side surface 233 connecting an end of the upper end surface 231 and an end of the lower end surface 232. In addition, a cut line 234 cut inward toward the center line C2 may be formed at a portion at which the lower end surface 232 protrudes outward from the one side surface 200b.

In a state in which the outer side surface 233 of the protruding part 230 is disposed to match the one side surface 200b of the front panel 200 so that the front bonding line 200L is continuously connected to and extends along the one side surface, the folding structure 201 which is folded parallel to the center line C2 to constitute the protruding chamber 20 may be formed on the cut line 234. That is, the folding structure 201 may be formed by pulling an interior of the front panel 200 inward along the cut line 234 by a protruding length of the protruding part 230 and folding the front panel 200 along folding lines FL, and a size of the protruding chamber 20 may be defined according to a size of the protruding part 230.

In the embodiment, the upper end surface 231 of the protruding part 230 may be positioned at the same level as the upper surface 200a of the front panel 200 and consecutively connected to the upper surface 200a. Accordingly, the folding lines FL may be provided between the cut line 234 and the upper surface 200a to be parallel to the center line C2. In addition, an upper end of the folding structure 201 may become the sewing portion S sewed onto the rear panel 100 along with the front panel 200 as the front bonding line 200L is bonded to the rear bonding line 100L on the upper surface 200a of the front panel 200. Accordingly, when the protruding chamber 20 is inflated, an upper end of the protruding chamber 20 can be prevented from opening.

Figure 8:
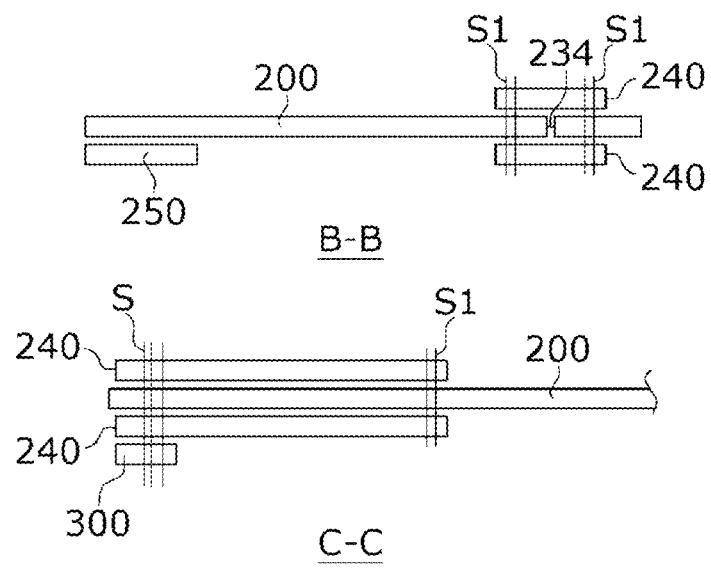
FIG. 8 shows schematic cross-sectional views along lines B-B and C-C in FIG. 6.

Referring to FIGS. 6 and 8, chamber reinforcement patches 240, which seal the cut line 234 in a state in which the folding structure 201 is formed, may be attached to a surface (for example, a rear surface) toward an inner space of the front panel 200 and an opposite surface (for example, a front surface).

Each of the chamber reinforcement patches 240 may be disposed to cover the cut line 234 so that one end portion may become the sewing portion S sewed onto an edge of the outer side surface 233 of the protruding part 230 and an edge of the one side surface 200b and the other end portion may become a sewing portion S1 sewed onto the front panel 200 at an inner end of the cut line 234. In this case, the one end portion of the chamber reinforcement patch 240 may become the final sewing portion S sewed onto the rear panel 100 along with the seam saver 300.

In addition, an upper end portion and a lower end portion of the chamber reinforcement patch 240 may become the sewing portion S1 sewed onto the front panel 200 along the cut line 234 interposed between the upper end portion and the lower end portion of the chamber reinforcement patch 240. In this case, a lower end of the folding structure 201 may be sewed onto the chamber reinforcement patch 240 in a folded state.

As described above, since the chamber reinforcement patches 240 are disposed to cover the cut line 234 on two surfaces of the front panel 200 and become the sewing portions S1 sewed to surround the cut line 234 so as to seal the cut line 234, when the protruding chamber 20 is inflated, a lower end of the protruding chamber 20 can be prevented from opening along with the cut line 234.

Figure 7:
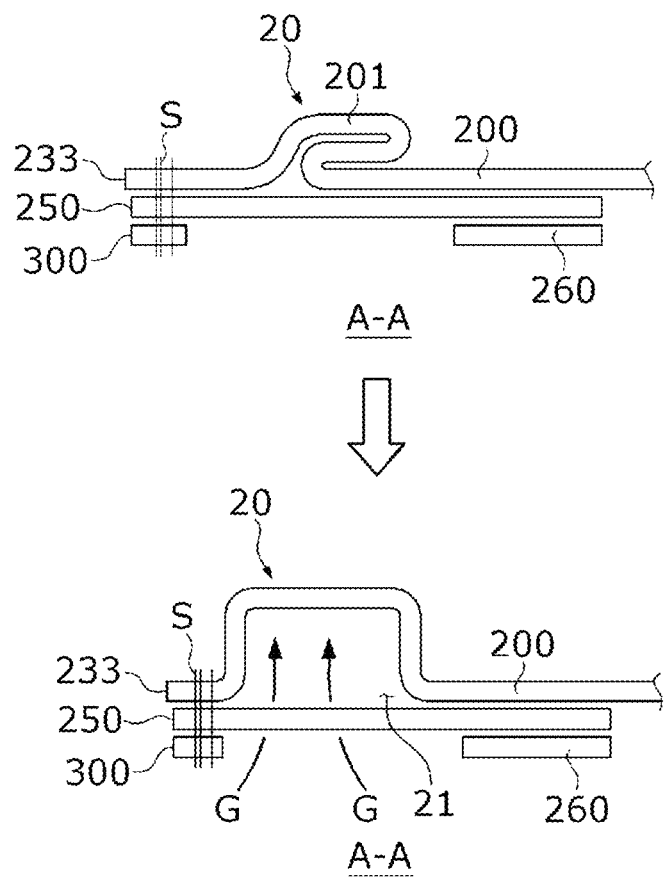
FIG. 7 is a schematic cross-sectional view along line A-A in FIG. 6.

Referring to FIGS. 6 and 7, a chamber strap 250, which supports an opening 21 of the protruding chamber 20 facing the inner space R of the front panel 200 to maintain a shape of the opening 21 in a state in which the protruding chamber 20 is inflated, may be attached to a surface facing the inner space R of the front panel 200 in a horizontal direction perpendicular to the center line C2.

One end portion of the chamber strap 250 may become the sewing portion S sewed onto the edge of the outer side surface 233 of the protruding part 230, and the other end portion may become a sewing portion S2 sewed onto a central portion of the front panel 200 and be disposed to cross the folding structure 201. In this case, the one end portion of the chamber strap 250 may become the final sewing portion S sewed onto the rear panel 100 along with the seam saver 300 at the edge of the outer side surface 233 of the protruding part 230.

As described above, the protruding chamber 20, which is inflated along with the main body 10 and partially protrudes toward a passenger in front of the protruding chamber 20, may be integrally provided with the front panel 200 of the airbag cushion 1 according to the embodiment of the present invention. Particularly, since the protruding chamber 20 is provided with the folding structure 201 in a state in which a part of the front panel 200 is folded, a part of the front panel 200 forms the protruding chamber 20, and as the main body 10 is inflated, the folding structure 201 is inflated while unfolded.

Referring to the drawings, a front tether 260 may be disposed to be attached around the inner space R of the main body 10.

One end portion of the front tether 260 may be connected to a central portion of the surface facing the inner space of the front panel 200, and the other end portion may be connected to the rear panel 100. In this case, the one end portion of the front tether 260 may become a sewing portion S3 sewed onto the chamber strap 250 and finally sewed onto the front panel 200 along with the chamber strap 250. In addition, the chamber strap 250 may serve to reinforce attachment of the front tether 260. The other end portion of the front tether 260 may be sewed onto substantially the second rear center portion 121 of the rear panel 100 (see FIGS. 2 and 3).

The front tether 260 connected to the front panel 200 and the rear panel 100 may control a front collision amount of the airbag cushion 1 by generating a tension in a direction opposite to a passenger in a passenger seat in a forward direction and accordingly pulling the front panel 200 when the main body 10 of the airbag cushion 1 is inflated.

Figure 9:
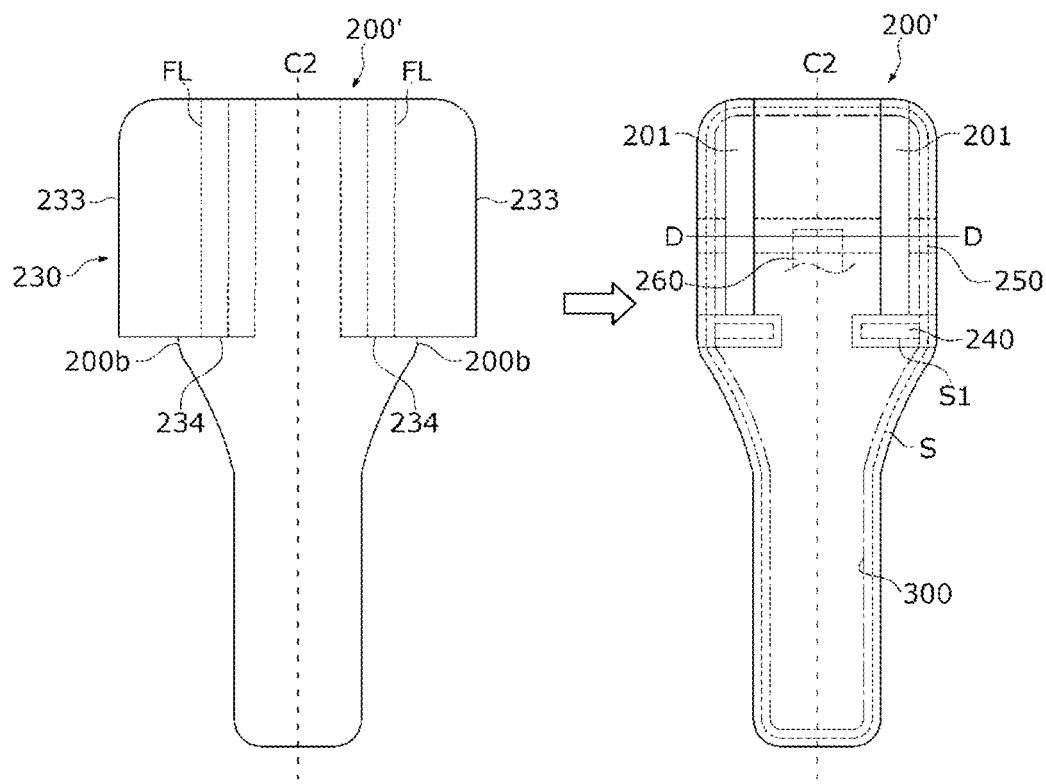
FIG. 9 is a schematic view illustrating a modified example of the front panel.
Figure 10:
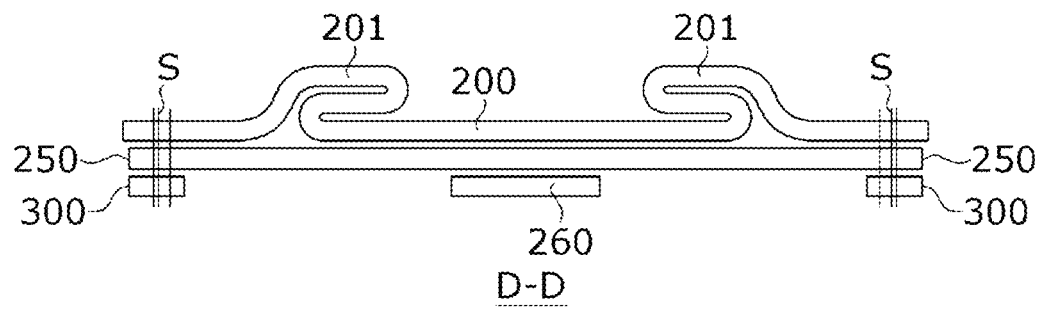
FIG. 10 is a schematic cross-sectional view along line D-D of FIG. 9.

FIGS. 9 and 10 are schematic views illustrating a modified example of a front panel 200'.

Referring to the drawings, the front panel 200' may include protruding parts 230 partially protruding outward from left and right surfaces 200b based on a center line C2 in a longitudinal direction.

That is, the present invention has a difference that two folding structures 201, in which the protruding parts 230 are provided on two side surfaces and folded along folding lines FL, are provided unlike the embodiment illustrated in FIG. 5 in which the folding structure 201, in which the protruding part 230 is formed only on the one side surface 200b to constitute the protruding chamber 20, is provided as a single folding structure 201.

Cut lines 234 cut inward toward the center line C2 may be formed to face each other at portions at which lower end surfaces 232 of the protruding parts 230 protrude outward from side surfaces.

In a state in which outer side surfaces 233 of the protruding parts 230 are disposed to match the side surfaces 200b of the front panel 200' so that a front bonding line 200L is continuously connected to and extends along and the side surfaces 200b, the folding structures 201 which are folded parallel to the center line C2 to constitute the protruding chamber 20 may be formed on the cut lines 234.

In addition, chamber reinforcement patches 240, which seal the cut lines 234 in a state in which the folding structures 201 are formed, may be attached to the front panel 200'. In addition, a chamber strap 250, which supports an opening of the protruding chamber 20 facing an inner space R to maintain a shape of the opening in a state in which the protruding chamber 20 is inflated, may be attached to the front panel 200'.

In the chamber strap 250, one end portion may become a sewing portion S sewed onto an edge of the outer side surface 233 of the protruding part 230 at one side, the other end portion may become a sewing portion S sewed onto an edge of the outer side surface 233 of the protruding part 230 at the other side, and a central portion may be sewed onto the central portion of the front panel 200' to be disposed to integrally cross a pair of folding structures 201.

Figure 11:
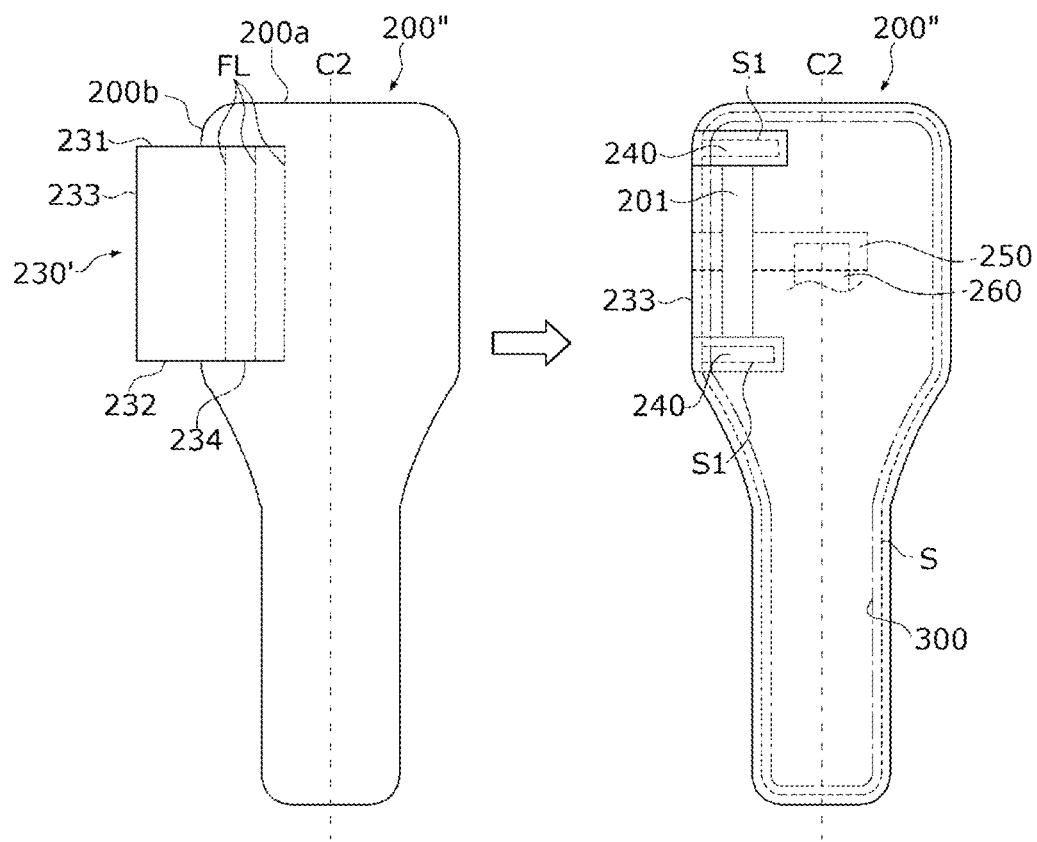
FIG. 11 is a schematic view illustrating a front panel according to another embodiment.

FIG. 11 is a schematic view illustrating a front panel 200" according to another embodiment.

Referring to the drawing, the front panel 200" may include a protruding part 230' partially protruding outward from at least one side surface 200b of left and right surfaces based on a center line C2 in a longitudinal direction.

The protruding part 230' may include an upper end surface 231, a lower end surface 232, and an outer side surface 233 connecting an end of the upper end surface 231 and an end of the lower end surface 232. In addition, a cut line 234 cut inward toward the center line C2 may be formed at a portion at which the lower end surface 232 protrudes outward from the one side surface 200b.

In addition, the upper end surface 231 of the protruding part 230' may be positioned at a different level from an upper surface 200a of the front panel 200" so as to be stepped with respect to the upper surface 200a. In addition, in the front panel 200", the cut line 234 cut inward toward the center line C2 may be formed at a portion at which the upper end surface 231 protrudes outward from the one side surface 200b, and the upper end surface 231 may be continuously connected to the cut line 234.

That is, the present embodiment has a difference that the upper end surface 231 of the protruding part 230' is provided to be stepped with respect to the upper surface 200a of the front panel 200" unlike the embodiment illustrated in FIG. 5 in which the upper end surface 231 of the protruding part 230 is positioned at the same level as the upper surface 200a of the front panel 200 to be consecutively connected to the upper surface 200a. In addition, there is a difference that the cut line 234 connected to the upper end surface 231 of the protruding part 230' is additionally formed.

In a state in which the outer side surface 233 of the protruding part 230' is disposed to match the one side surface 200b of the front panel 200" so that a front bonding line 200L is continuously connected to and extends along the one side surface 200b, a folding structure 201, which is folded along folding lines FL to be parallel to the center line C2 to constitute a protruding chamber 20, may be formed on the cut lines 234. The folding lines FL may be provided between the cut line 234 connected to the lower end surface 232 of the protruding part 230' and the cut line 234 connected to the upper end surface 231 of the protruding part 230' to be parallel to the center line C2.

As in the drawing, chamber reinforcement patches 240, which seal the cut lines 234 in a state in which the folding structure 201 is formed, may be attached to a surface facing an inner space R of the front panel 200" and an opposite surface.

Each of the chamber reinforcement patches 240 may be disposed to cover the cut line 234, one end portion of the chamber reinforcement patch 240 may become a sewing portion S sewed onto an edge of the outer side surface 233 of the protruding part 230' and an edge of the one side surface 200b, and the other end portion may become a sewing portion S1 sewed onto the front panel 200" at an inner end of the cut line 234. In this case, the one end portion of the chamber reinforcement patch 240 may be finally sewed onto a rear panel 100 along with a seam saver 300.

In addition, each of an upper end portion and a lower end portion of the chamber reinforcement patch 240 may become the sewing portion S1 sewed onto the front panel 200" along the cut line 234 interposed between the upper end portion and the lower end portion. In this case, each of a lower end and an upper end of the folding structure 201 may be sewed onto the chamber reinforcement patch 240 in a folded state.

As described above, since the chamber reinforcement patches 240 are disposed to cover the cut lines 234 on two surfaces of the front panel 200" and become sewing portions S1 sewed to surround the cut lines 234 so as to seal the cut lines 234, when the protruding chamber 20 is inflated, an upper end and a lower end of the protruding chamber 20 can be prevented from opening along with the cut lines 234.

In addition, a chamber strap 250, which supports an opening of the protruding chamber 20 facing the inner space R to maintain a shape of the opening in a state in which the protruding chamber 20 is inflated, may be disposed on the surface facing the inner space R of the front panel 200".

In the present embodiment, an example of the protruding part 230' provided to partially protrude outward from the one side surface 200b of the front panel 200" is described, but the present invention is not limited thereto. For example, the protruding part 230' may also be provided on each of two side surfaces 200b of the front panel 200".

Figure 12:
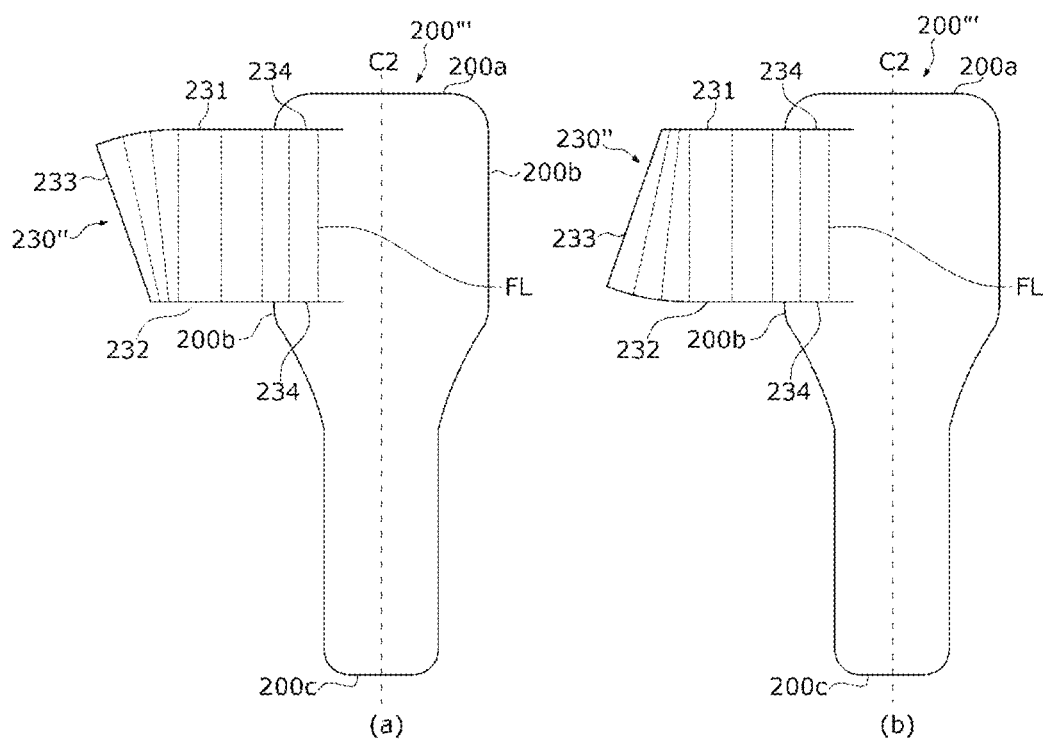
FIG. 12 is a set of schematic views illustrating a modified example of the front panel.

FIG. 12 is a set of schematic views illustrating modified examples of a front panel 200'".

Referring to the drawings, the front panel 200'" may include a protruding part 230" partially protruding outward from at least one side surface 200b of left and right surfaces 200b based on a center line C2 in a longitudinal direction.

The protruding part 230" may include an upper end surface 231, a lower end surface 232, and an outer side surface 233 connecting an end of the upper end surface 231 and an end of the lower end surface 232. In addition, a cut line 234 cut inward toward the center line C2 may be formed at a portion at which the lower end surface 232 protrudes outward from the one side surface 200b.

In addition, the upper end surface 231 of the protruding part 230" may be positioned at a different level from an upper surface 200a of the front panel 200'" so as to be stepped with respect to the upper surface 200a. In addition, the cut line 234 cut inward toward the center line C2 may be formed at a portion at which the upper end surface 231 of the front panel 200'" protrudes outward from the one side surface 200b, and the upper end surface 231 may be continuously connected to the cut line 234.

The embodiment illustrated in FIG. 12A has a difference that the upper end surface 231 extends to protrude a length greater than a length of the lower end surface 232 unlike the embodiment illustrated in FIG. 11 in which the upper end surface 231 and the lower end surface 232 of the protruding part 230' extend to protrude the same length. In addition, the embodiment illustrated in FIG. 12B has a difference that a length of the lower end surface 232 is greater than a length of the upper end surface 231 so that the lower end surface 232 protrudes.

In such an asymmetric structure, when a protruding chamber 20 is inflated, since the protruding chamber 20 asymmetrically protrudes, for example, an upper side protrudes further than a lower side, head rotation of a passenger can be effectively prevented.

Figure 13:
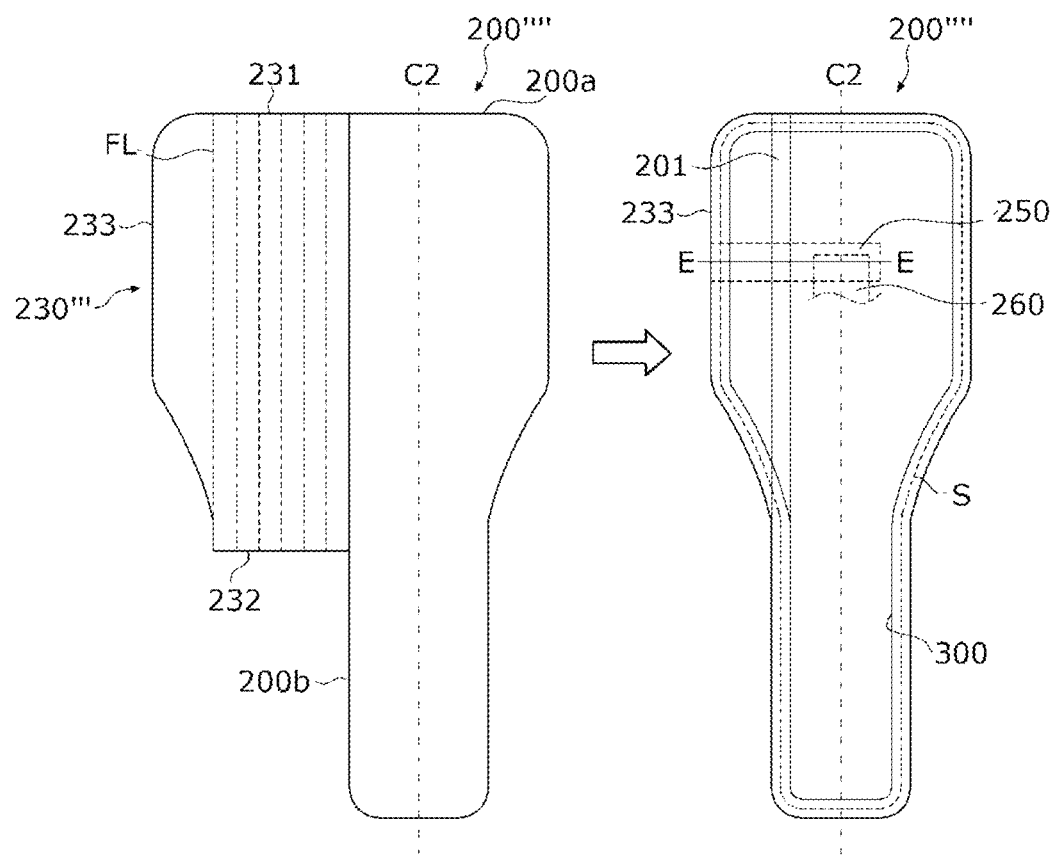
FIG. 13 is a schematic view illustrating a front panel according to still another embodiment.
Figure 14:
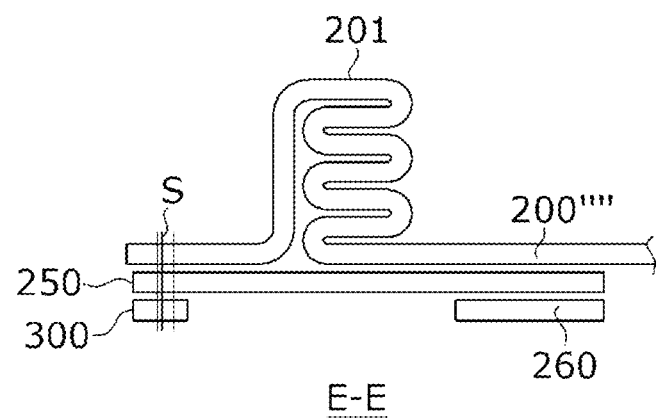
FIG. 14 is a schematic cross-sectional view along line E-E in FIG. 13.

FIGS. 13 and 14 are schematic views illustrating a front panel 230"" according to still another embodiment.

Referring to the drawings, the front panel 200"" may include a protruding part 230'" partially protruding outward from at least one side surface 200b of left and right surfaces 200b based on a center line C2 in a longitudinal direction.

The protruding part 230'" may include an upper end surface 231, a lower end surface 232, and an outer side surface 233 connecting an end of the upper end surface 231 and an end of the lower end surface 232. The upper end surface 231 of the protruding part 230'" may be positioned at the same level as an upper surface 200a of the front panel 200"" to be consecutively connected to the upper surface 200a.

The present embodiment has a difference that a cut line is not formed unlike the embodiment illustrated in FIG. 5 in which the cut line 234 cut inward toward the center line C2 is formed at the portion at which the lower end surface 232 of the protruding part 230 protrudes outward from the one side surface 200b. Accordingly, a cutting process for forming a cut line 234 and a process of attaching a chamber reinforcement patch 240 for sealing the cut line 234 as in FIG. 5 can be omitted.

In a state in which the outer side surface 233 of the protruding part 230'" is disposed to match the one side surface 200b of the front panel 200"" so that a front bonding line 200L is continuously connected to and extends along the one side surface 200b, a folding structure 201, which is folded along folding lines FL to be parallel to the center line C2 to constitute a protruding chamber 20, may be formed on the protruding part 230'". The folding lines FL may be provided between the lower end surface 232 of the protruding part 230''' and the upper end surface 231 of the protruding part 230''' to be parallel to the center line C2.

An upper end and a lower end of the folding structure 201 may become sewing portions S sewed onto a rear panel 100 along with a seam saver 300 on the upper surface 200a and the side surface 200b of the front panel 200''''.

In addition, a chamber strap 250, which supports an opening of the protruding chamber 20 facing an inner space R to maintain a shape of the opening in a state in which the protruding chamber 20 is inflated, may be attached to a surface facing the inner space R of the front panel 200''''.

According to embodiments, the present invention can provide an airbag cushion which can protect a passenger by effectively restraining rotational movement of a head of the passenger.

Effects of the present invention is not limited the above-described effect, other effects, which are not described above, will be clearly understood by those skilled in the art through the appended claims.

While the present invention has been described above with reference to exemplary embodiments, it may be understood by those skilled in the art that various modifications and changes of the present invention may be made within a range not departing from the spirit and scope of the present invention defined by the appended claims. In addition, it should be interpreted that differences related to modifications and changes fall within the scope of the present invention defined by the appended claims.

What is claimed is:

1. An airbag cushion comprising:
a main body including a rear panel having a rear bonding line and a front panel having a front bonding line bonded to the rear bonding line and disposed to face a passenger when inflated by a gas introduced into an inner space formed between the front panel and the rear panel;
a protruding chamber adapted to be inflated and protrude towards the passenger from the front panel,
wherein the protruding chamber is provided with a folding structure when a part of the front panel is folded,
the front panel including a protruding part partially protruding from at least one side surface of left and right surfaces based on a center line in a longitudinal direction,
the protruding part includes an upper end surface, a lower end surface, and an outer side surface connecting an end of the upper end surface and an end of the lower end surface, and
the folding structure is unfolded and inflated as the main body is inflated by the gas introduced into the inner space;
a cut line cut inward toward the center line is formed at a portion at which the lower end surface protrudes outward from the one side surface;
chamber reinforcement patches, which seal the cut line when the folding structure is formed, are attached to a surface facing the inner space of the front panel and an opposite surface;
each of the chamber reinforcement patches is disposed to cover the cut line;
one end portion of the chamber reinforcement patch is sewed onto an edge of the outer side surface of the protruding part and an edge of the one side surface;
another end portion of the chamber reinforcement patch is sewed onto the front panel at an inner end of the cut line; and
an upper end portion and a lower end portion of the chamber reinforcement patch are sewed onto the front panel along the cut line between the upper end portion and the lower end portion.

2. The airbag cushion of claim 1, wherein:
the folding structure, which is folded to be parallel to the center line to form the protruding chamber, is formed on the cut line when the outer side surface is disposed to match the one side surface so that the front bonding line is connected to and extends along the one side surface.

3. The airbag cushion of claim 2, wherein:
a chamber strap, which supports an opening facing the inner space to maintain a shape of the opening when the protruding chamber is inflated, is attached to a surface facing the inner space of the front panel; and
one end portion of the chamber strap is sewed onto an edge of the outer side surface of the protruding part, and another end portion is sewed onto a central portion of the front panel so that the chamber strap is disposed to cross the folding structure.

4. The airbag cushion of claim 3, further comprising a front tether of which one end portion is connected to the central portion of the front panel and another end portion is connected to the rear panel.

5. The airbag cushion of claim 2, comprising a seam saver interposed between the rear panel and an edge of the front panel and integrally sewed onto the rear panel and the front panel,
wherein the seam saver reinforces a strength of a portion in which the rear panel and the front panel are sewed onto each other.

6. The airbag cushion of claim 2, wherein the upper end surface of the protruding part is positioned at a same level as an upper surface of the front panel to be consecutively connected to the upper surface.

7. The airbag cushion of claim 2, wherein the upper end surface of the protruding part is positioned at a different level from an upper surface of the front panel to be stepped with respect to the upper surface.

8. The airbag cushion of claim 7, wherein:
a second cut line cut inward towards the center line is also formed in the front panel at the portion at which the upper end surface protrudes outward from the one side surface; and
the upper end surface is connected to the second cut line.

9. The airbag cushion of claim 2, wherein:
the front bonding line includes a first front bonding line disposed in an upper portion of the front panel and a second front bonding line disposed in a lower portion of the front panel; and
the rear bonding line includes a first rear bonding line bonded to the first front bonding line, a second rear bonding line bonded to the second front bonding line, and a third rear bonding line disposed between the first rear bonding line and the second rear bonding line and including first bonding portions and second bonding portions to be bonded to each other.

10. An airbag cushion comprising:
a main body including a rear panel having a rear bonding line and a front panel having a front bonding line bonded to the rear bonding line and disposed to face a passenger when inflated by a gas introduced into an inner space formed between the front panel and the rear panel;

a protruding chamber adapted to be inflated and protrude towards the passenger from the front panel, wherein the protruding chamber is provided with a folding structure when a part of the front panel is folded, the folding structure is unfolded and inflated as the main body is inflated by the gas introduced into the inner space;

the front bonding line includes a first front bonding line disposed in an upper portion of the front panel and a second front bonding line disposed in a lower portion of the front panel;

the rear bonding line includes a first rear bonding line bonded to the first front bonding line, a second rear bonding line bonded to the second front bonding line, and a third rear bonding line disposed between the first rear bonding line and the second rear bonding line and including first bonding portions and second bonding portions to be bonded to each other;

the first front bonding line includes a first front center portion forming an upper surface of the front panel and first front side portions extending downward from two ends of the first front center portion and forming a side surface of the front panel; and the second front bonding line includes second front side portions having a width smaller than a width of the first front side portions and extending downward from the first front side portions to form the side surface of the front panel and a second front center portion connecting lower ends of the second front side portions to form a lower surface of the front panel.

11. The airbag cushion of claim 10, wherein:

the first rear bonding line includes a first rear center portion bonded to the first front center portion and first rear side portions of which first ends are connected to the first rear center portion and other ends are connected to the first bonding portions and are bonded to the first front side portions; and the second rear bonding line includes a second rear center portion bonded to the second front center portion and second rear side portions of which first ends are connected to the second rear center portion and other ends are connected to the second bonding portions and are bonded to the second front side portions.

12. The airbag cushion of claim 11, wherein:

the rear panel includes a first panel having the first rear bonding line, the first bonding portions, and a first bonding region disposed under the first bonding portions and a second panel having the second rear bonding line, the second bonding portions, and a second bonding region disposed under the second bonding portions;

a first inlet is formed in the first panel;

a second inlet is formed in the second panel;

the first panel and the second panel are disposed to overlap to connect the first inlet and the second inlet when the second panel is reversed so that the second bonding region faces upward; and the first panel and the second panel are connected to each other in the first bonding region and the second bonding region.

* * * * *